United States Patent [19]
Peng

[11] Patent Number: 5,593,652
[45] Date of Patent: Jan. 14, 1997

[54] METHOD FOR INCREASING THE PRODUCTION CAPACITY OF SULFURIC ACID PLANTS AND PROCESSES

[75] Inventor: Peter H. Peng, Lakeland, Fla.

[73] Assignee: Vulcan Materials Company, Birmingham, Ala.

[21] Appl. No.: 495,396

[22] Filed: Jun. 28, 1995

[51] Int. Cl.⁶ .......................... C01B 17/69; C01B 17/20
[52] U.S. Cl. ...................... 423/522; 423/243.01
[58] Field of Search ................. 423/522, 243.01

[56] References Cited

U.S. PATENT DOCUMENTS

| | | | |
|---|---|---|---|
| 3,733,393 | 5/1973 | Couillaud et al. | 423/522 |
| 3,760,061 | 9/1973 | Hammond | 423/522 |
| 3,780,499 | 12/1973 | Dorr et al. | 423/522 |
| 3,788,043 | 1/1974 | Dorr et al. | 423/522 |
| 3,917,798 | 11/1975 | Konopik et al. | 423/242 |
| 3,944,401 | 3/1976 | Dorr et al. | 423/522 |

*Primary Examiner*—Gary P. Straub
*Attorney, Agent, or Firm*—Burns, Doane, Swecker & Mathis, L.L.P.

[57] ABSTRACT

A process for removing $SO_2$ from a gas mixture including $SO_3$ and $SO_2$ having a volume ratio of $SO_3$ to $SO_2$ greater than 1. The process includes intimately contacting the gas mixture in a contacting zone, removing a stream of purified gas containing less $SO_2$ than the gas mixture from an upper portion of the contacting zone, and removing a stream of sulfuric acid from a lower portion of the contacting zone. Also provided are processes for manufacturing sulfuric acid utilizing the process for removing $SO_2$ which allow increasing the production of concentrated sulfuric acid solutions by producing more sulfur trioxide without an increase of sulfur dioxide emissions.

25 Claims, 6 Drawing Sheets

METHOD FOR INCREASING THE PRODUCTION CAPACITY OF SULFURIC ACID PLANTS AND PROCESSES

BACKGROUND OF THE INVENTION

1. Field of the Invention

The present invention relates to a method for increasing and varying the production capacity of sulfuric acid processes and, in particular, increasing the production of concentrated sulfuric acid solutions by producing more sulfur trioxide without an increase of sulfur dioxide emissions.

2. Description of the Prior Art

Sulfuric acid is the highest volume chemical manufactured in the world. Its production volume has been historically used to measure the industrial development of nations and societies. Current worldwide capacity is estimated at about 570,000 tons per day. About 30%, or 170,000 tons per day, of the world capacity is located in the United States.

Most of the sulfuric acid produced is consumed to produce phosphoric acid in integrated fertilizer complexes. Typically, several sulfuric acid plants will be co-located in such industrial complexes. For example, several large United States fertilizer complexes host multiple sulfuric acid plants which generate over 10,000 tons of sulfuric acid per day.

The principal raw materials used to make sulfuric acid are, first, an oxidizable sulfur-containing material, such as elemental sulfur itself, iron pyrite or other sulfide ores, and hydrogen sulfide, and second, a decomposable sulfate such as calcium sulfate or spent (contaminated and diluted) sulfuric acid. In addition, an oxygen-containing oxidizing gas such as air or oxygen and also water are necessary for the processing. In most types of plants, the first stage of the process has the objective of producing a reasonably continuous, essentially contaminant-free gas stream containing essentially sulfur dioxide, oxygen, and nitrogen, by oxidation of the sulfur-containing feed material in a kiln or other suitable thermal combustion zone. When spent sulfuric acid is used as a raw material for producing the desired sulfur dioxide and/or trioxide, it is injected as a liquid spray into the combustion zone and there mixed with a carbonaceous material such as fuel to provide the heat necessary for evaporation of the water content of the spent sulfuric acid and for decomposition of $H_2SO_4$ into $H_2O$, $SO_3$, $SO_2$ and $O_2$ when the mixture is burnt.

A vanadium/potassium sulfate catalyst supported on a diatomaceous earth carrier is typically used in the next stage, a catalytic oxidation stage, to convert sulfur dioxide and oxygen in the process-gas stream to sulfur trioxide in a heterogeneous-type reaction (gas phase bulk reaction with adsorbed solid and molten salt phase intermediate steps). However, other catalysts also well-known in the art are likewise potentially usable in this catalytic oxidation reaction although only the vanadium-type catalysts are used commercially. If the initial oxygen concentration of the process gas is low, additional air or oxygen is added prior to or during catalytic oxidation to ensure that them is an excess over stoichiometric needs for conversion of gaseous sulfur dioxide to gaseous sulfur trioxide. After conversion of the sulfur dioxide to sulfur trioxide, the sulfur trioxide is reacted with water to form sulfuric acid in an $SO_3$ absorption zone, which is typically a tower packed with 3" ceramic saddles or less commonly a Venturi scrubber. In either one, the absorption media is a strong sulfuric acid solution (96–99.8% $H_2SO_4$).

While reaction of $SO_3$ with the water portion of the concentrated sulfuric acid is rapid and virtually complete, $SO_2$ is removed from the gas phase less well and is represented by the equilibrium reaction forming sulfurous acid ($H_2SO_3$) in concentrated sulfuric acid media as follows:

Of course, the extent of reaction is dependent upon the reaction medium, and in particular, the concentration of sulfuric acid in the reaction medium, as well as the temperature of the reaction medium. In practice, those skilled in the art may refer to solubility charts, tables, or diagrams to determine the amount of $SO_2$ that dissolves in a given concentrated sulfuric acid solution at a given temperature. Since at least some of the sulfur dioxide does not dissolve, those skilled in the art will also recognize that the gas leaving the absorption tower therefore primarily contains $SO_2$ as the active sulfur compound.

In most countries in the world, sulfuric acid plants are nowadays limited by the amount of sulfur dioxide that they are allowed to emit to the atmosphere. The U.S. Environmental Protection Agency currently limits sulfur dioxide emissions to four pounds per short ton (2 kg per metric ton) of sulfuric acid $H_2SO_4$ produced. This is equivalent to a minimum of 99.7% sulfur dioxide conversion to sulfur trioxide in the catalytic conversion step. Accordingly, this condition represents the limit of maximum practical plant capacity, and most plants operate at this limit or as close as possible to it, because this is the most economical, permissible operating condition.

It is well-known to sulfuric acid plant engineers and designers how the capacity/conversion relationship will be observed in each sulfuric acid plant. This relationship will depend on the amount and condition of the catalyst beds in each plant and on the heat exchange capacity of the ancillary equipment, i.e., the equipment that provides temperature control to the catalytic beds. The exact response will vary from plant to plant depending on catalyst loading (ratio of amount of catalyst to the amount of sulfur dioxide required to be converted) and catalyst condition.

A typical plant response to burning more sulfur is an increase in the sulfur dioxide emissions from the stack. This is because an increase in the amount of sulfur dioxide to be oxidized catalytically results in a shift of the equilibrium in the reactor or converter such that the efficiency of the catalytic reaction from sulfur dioxide to sulfur trioxide is reduced. As a result of the shift in the equilibrium, more unconverted sulfur dioxide remains in the effluent. Thus, when a sulfuric acid plant is pushed to exceed the limit of its capacity by burning more sulfur, the sulfur dioxide emissions through the stack will eventually exceed the 4 lb/ton legal limit. As a result, the plant must reduce its rate or risk legal action.

In cases of higher than desirable sulfur dioxide emissions, the prescribed emission requirements are sometimes met by the use of tail-gas scrubbers added for this purpose, especially in conjunction with low-conversion, single-stage $SO_3$ absorption plants, and most commonly in existing plants rather than in new plants. The gas treated in such $SO_2$ tail-gas scrubbers subsequent to $SO_3$ absorption does not contain any measurable amount of sulfur trioxide under normal conditions.

A number of $SO_2$ tail-gas scrubbing processes are available. These known tail-gas scrubbing techniques variously depend on ammonia, sodium hydroxide or hydrogen peroxide as the scrubbing liquid, but each suffers from certain disadvantages. For all such tail-gas scrubbing techniques, a separate scrubbing tower to convert unwanted sulfur dioxide emissions must be installed at the tail end of the plant. In addition, when a base such as ammonia is used, a side stream of ammonium sulfate is produced, requiring the marketing of a chemical material which may or may not be easily sold. Further, the reaction of ammonium salt solutions with sulfur dioxide results in submicron aerosol fumes which require sophisticated and expensive mist eliminators for efficient emission control. Scrubbing with sodium hydroxide in a separate tower accomplishes substantially the same result as scrubbing with ammonia. However, the by-product sodium sulfate is less salable and less usable than is ammonium sulfate within the production and marketing confines of a fertilizer manufacturer.

Oxidation with peroxide compounds to eliminate unwanted sulfur dioxide emissions has been described in the prior art, e.g., U.S. Pat. No. 3,917,798. This prior art describes the removal of sulfur dioxide from sulfur dioxide-containing combustion gases by scrubbing them with sulfuric acid solutions and a peroxide compound, subsequent to a previous removal of sulfur trioxide therefrom by absorption or otherwise. The peroxide-based scrubbing solutions disclosed in U.S. Pat. No. 3,917,798 vary in concentration between 0.01% and 25% $H_2O_2$ and between 30 and 60% sulfuric acid, but are thereafter further concentrated up to 90% by heat and evaporation, whereby residual $H_2O_2$ is decomposed. In other words, these prior teachings only deal with sulfur dioxide abatement, and are not concerned with the sulfuric acid production capacity of sulfuric acid plants, much less with any debottlenecking of their basic plant design. According to such prior art, the $SO_2$ scrubbing is performed in a terminal scrubbing tower, essentially independent of the sulfuric acid production plant proper. No free sulfur trioxide is present in the gas phase in this stage, as it was substantially completely removed in the $SO_3$ absorption stage of the plant proper.

In each of the prior $SO_2$ scrubbing techniques described above, expensive equipment which takes up valuable space is necessary and, in the case of scrubbing with a base, produce a usable but generally unwanted by-product. Besides these disadvantages, the additional scrubber equipment necessary causes a significant, additional pressure drop to the overall gas system and thus a decrease in the gas handling capacity of the system.

The present invention makes it possible to increase and readily vary sulfuric acid production capacity in new or existing plants without requiting installation of separate $SO_2$ scrubbing equipment and without exceeding sulfur dioxide emissions.

SUMMARY OF THE INVENTION

It is, therefore, a primary object of the present invention to provide an improved method for increasing and/or varying the production capacity of sulfuric acid processes by the internal use of a relatively very small amount of an oxidizing agent, which converts dissolved $H_2SO_3$ to $H_2SO_4$ thereby allowing, according to the chemical equilibrium, more $SO_2$ to be removed from the gas phase, and serves to keep sulfur dioxide emissions within the required limits. This invention provides a method for burning more sulfur in a sulfuric acid plant than is otherwise legally permissible, thereby increasing sulfuric acid capacity without increasing sulfur dioxide emissions beyond prescribed limits.

In one embodiment of the present invention, sulfuric acid is made in an otherwise well-known manner by spraying molten sulfur and adding an excess of oxygen in the form of air into a non-catalytic sulfur burner or combustion zone to produce sulfur dioxide; converting a major proportion of the sulfur dioxide in the resulting gas into sulfur trioxide in a catalytic conversion zone such as an adiabatic catalytic converter; introducing the resulting gas mixture comprising sulfur trioxide and residual sulfur dioxide to a single-stage $SO_3$ absorption zone containing aqueous sulfuric acid and a peroxide compound as an oxidizing agent to produce sulfuric acid by absorption of sulfur trioxide therein while also absorbing sulfur dioxide and sequentially converting the relatively small amount of resulting sulfurous acid to additional sulfuric acid and removing a stream of sulfuric acid and a stream of emission gas from the absorption zone.

In another embodiment of the invention, sulfuric acid is made in an otherwise well-known manner by producing sulfur dioxide in any convenient manner; introducing it into an otherwise well-known adiabatic catalytic converter to convert a major proportion of the sulfur dioxide into sulfur trioxide; absorbing the sulfur trioxide from the resulting mixture by means of water or aqueous sulfuric acid in a first, $SO_3$ absorption zone to produce sulfuric acid; subjecting the unconverted sulfur dioxide gas again to catalytic oxidation in another catalytic conversion zone; introducing both the resulting additional sulfur trioxide and all of the remaining unconverted sulfur dioxide to a second, $SO_3$ absorption zone in which concentrated sulfuric acid containing added peroxide compound is recirculated; and removing a stream of sulfuric acid product and a stream of purified emission gas from the second $SO_3$ absorption zone.

In yet another embodiment of the invention, sulfuric acid is produced by introducing a gaseous mixture comprising sulfur dioxide and sulfur trioxide from any convenient source into an existing absorption zone, which could be the $SO_3$ absorption tower, a packed tower containing a downwardly moving concentrated sulfuric acid solution admixed with an amount of a peroxygen compound sufficient to remove a predetermined amount of sulfur dioxide from the system by conversion into sulfuric acid, and converting the introduced sulfur trioxide and predetermined amount of sulfur dioxide into sulfuric acid in the tower while maintaining the emission of sulfur dioxide from the tower at or below the legal limit which is currently 4 lb/short ton of sulfuric acid produced. Of course, the legal limit may vary over time or particular plants may have self-imposed lower limits. Such limits may be lower than the current EPA limit, for example, as low as 2 lb/short ton, 1 lb/short ton, or 0.5 lb/short ton or even lower. Alternatively, it is possible for the limit to be higher than the current EPA limit, for example, because of grandfathered rights. Such higher limits may be, for example, 5 or 6 lb/short ton of sulfuric acid produced.

The sulfur dioxide fed into such processes may first be made, for instance, in a sulfur burner, in a pyrite ore roaster or in a furnace where spent sulfuric acid is dehydrated and decomposed into oxides of sulfur when mixed with fuel oil and air under combustion conditions. Hydrogen peroxide or other peroxide compound such as peroxymonosulfuric acid is introduced into the $SO_3$ absorption tower where $SO_2$ removal is also effected, and is added in a sufficient amount to convert sulfur dioxide to sulfuric acid in the tower to the desired extent. By use of such processes, even when the conversion of sulfur dioxide to sulfur trioxide in the adiabatic catalytic converter is below 99.7%, emission of sulfur dioxide from the absorption tower can be maintained at or below 4 lb/short ton of sulfuric acid produced. It should be emphasized that the invention does not require the removal of all or even a major part of sulfur dioxide from the emission gas, but only requires removal of the incremental amount of sulfur dioxide which is present in the emission gas because of the increased combustion of sulfur earlier on and which would cause the SO$_2$ emission to exceed the prescribed limit.

Catalyst deterioration is another situation common in sulfuric acid plants which can cause the plant to be unable to meet emission requirements, and can force the plant to reduce its production rate substantially. Catalyst performance can deteriorate for a number of reasons, which include aging, poisoning, salt migration, or just plain getting dirty. Sometimes the timing of such deterioration is such that a shut down for catalyst replacement is not desirable. For example, there may be a need for product in the market. Or, the weather may be too cold for a shut down. This is common in cold climates, where a plant shut down for catalyst cleaning and replacement is only conceivable in the late spring or summer. In such case, the present invention could be quite useful to allow the plant to continue to operate in order to meet emissions even with a deteriorated catalyst until a convenient time for shutdown and catalyst cleaning or replacement can be arranged. It is understood that in such case the objective is simply to keep the plant running, at any rate, and not necessarily at a rate which exceeds the plant rated capacity.

While hydrogen peroxide and peroxymonosulfuric acid (also known as Caro's acid) are the preferred peroxide compounds used in this invention, other peroxide compounds such as peroxydisulfuric acid, persulfates, perphosphates, perborates or permanganates may be used similarly, inasmuch as any extraneous compounds thereby left behind in the sulfuric acid product are usually insignificant in view of the small proportion of peroxide addition required relative to the large volume of sulfuric acid produced. Also, as disclosed in, for instance, Patentschrift 670966, British Patent Specification 930,584, and Auslegeschrift 1234912, each of which are hereby incorporated by reference, anodic oxidation in an electrolytic cell or electrolysis of sulfuric acid may be used to generate hydrogen peroxide or persulfuric acid (peroxydisulfuric acid) for the process.

BRIEF DESCRIPTION OF THE DRAWINGS

The features of the present invention will become apparent from the description. The drawings are added merely to aid in explaining the process and the examples, and neither the drawings nor the examples should be considered as limiting the scope of the invention in any way.

DETAILED DESCRIPTION OF THE PREFERRED EMBODIMENTS OF THE INVENTION

The following description of various embodiments of the process of the present invention are merely illustrative of the present invention and they should not be considered as limiting the scope of the invention in any way, as these illustrations and other equivalents thereof will become more apparent to those versed in the art in the light of the present disclosure and the accompanying claims.

The process of the present invention may utilize any one of a number of conventional sulfuric acid producing processes. These processes include but are not limited to single-absorption sulfur-burning plants and double-absorption sulfur-burning plants both of which are described in Kirk-Othmer: Encyclopedia of Chemical Technology, Volume 22, 3rd Edition pp. 190–232, the contents of which are hereby incorporated by reference in their entirety.

Figure 1:
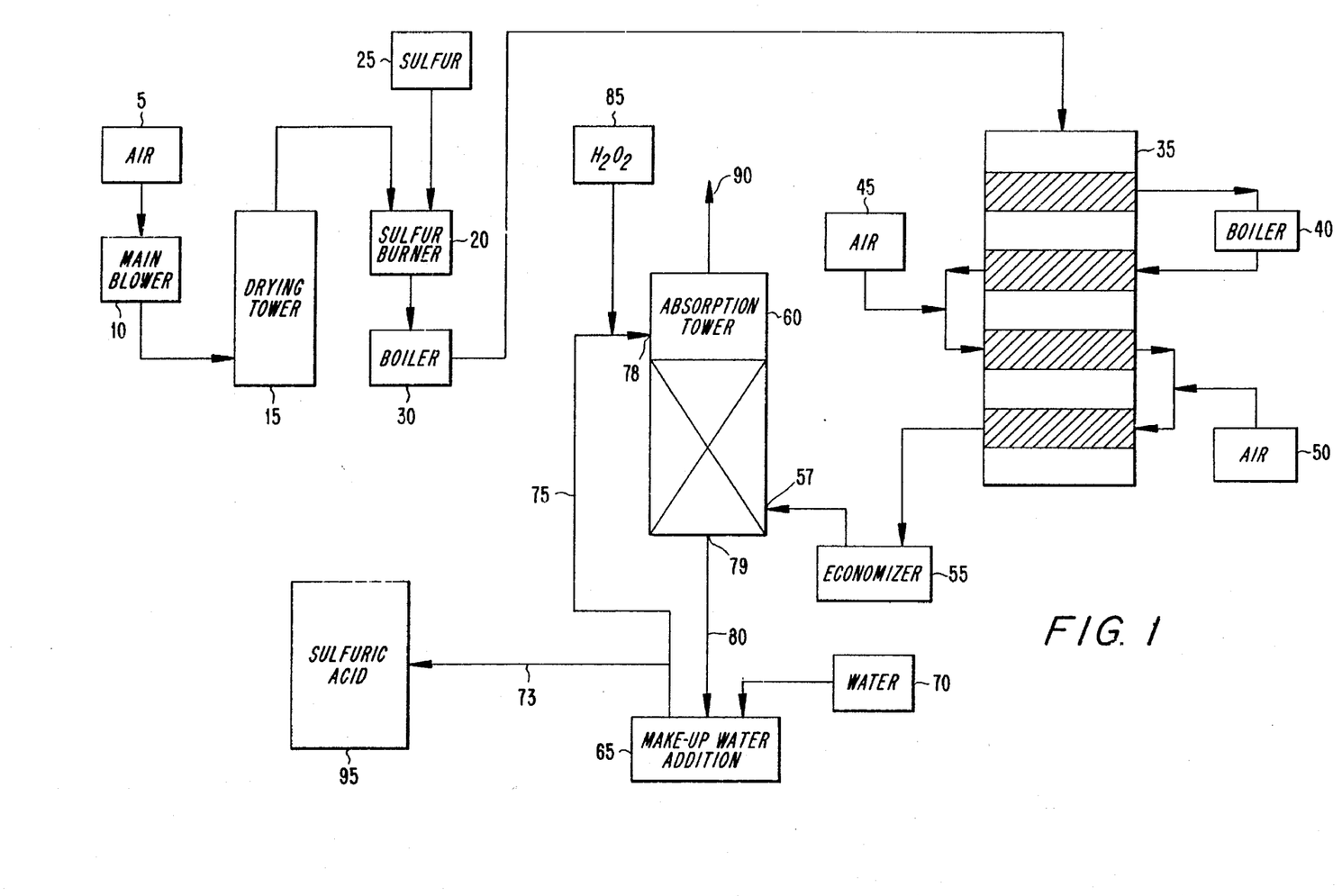
FIG. 1 illustrates a process for producing sulfuric acid containing a single absorption tower.

FIG. 1 shows a typical flow scheme for a sulfur-burning, four-pass catalytic conversion, single SO$_3$-absorption plant, modified according to the present invention. Plants of this design burn sulfur to generate a process-gas stream containing sulfur dioxide. While the description below provides various temperature ranges and concentrations, those skilled in the art will recognize that other process parameters may be utilized.

As shown in FIG. 1, dry air, preferably with a dew point of from −40° F. to −70° F., and more preferably a dew point of from −50° F. to −65° F., from the drying tower 15 is introduced into the sulfur burner 20.

Process air in sulfur-burning plants may be dried by contacting with preferably 93 to 98 wt %, and more preferably 96 to 98 wt %, sulfuric acid in a countercurrent, packed drying tower. Dry process air is used to minimize corrosion problems, especially to reduce corrosion problems in downstream equipment of the plant and stack emissions of sulfuric acid mist. Air is fed to the drying tower 15 by means of the main blower 10 which provides sufficient pressure to convey the process gas stream through the plant and out of the atmospheric stack.

Sulfur is injected in molten form into the sulfur burner 20 from a sulfur source 25. In the sulfur burner 20, an extremely exothermic reaction occurs producing a gas stream containing sulfur dioxide, oxygen, nitrogen and trace amounts of sulfur trioxide, carbon dioxide and water. Preferably, the stream exiting the sulfur burner contains 4–16%, preferably 6–13%, even more preferably 8–13%, and most preferably 11–12% by volume sulfur dioxide.

The heat of combustion from the sulfur burner 20 is removed in a boiler 30, which reduces the process-gas temperature to the desired converter 35 inlet temperature. Preferably, the inlet temperature range to the first converter pass is about 380°–450° C., and more preferably 400°–430° C.

Sulfur dioxide gas is catalytically oxidized to sulfur trioxide in converter 35 which operates adiabatically in each catalyst pass. The heat of oxidation raises the temperature of process gas in the first converter pass to preferably about 580°–650° C., and more preferably 600°–630° C. The temperature of hot gas exiting the first pass is lowered to the desired second-pass inlet temperature, preferably 390°–470° C., and even more preferably 410°–450° C., by removing the heat of reaction in a steam superheater or second boiler 40.

In converter passes downstream of the first pass, exit temperatures are limited by thermodynamic equilibrium conversions to a temperature of 550° C. and more likely 500° C. or less, a level at which materials of construction limitations are not a significant problem. To obtain desired reaction kinetics and sulfur dioxide conversions, the temperatures in the succeeding converter passes are controlled by dilution with additional air at 45 and 50 and a final "economizer" or gas cooler 55. It should be noted that the temperature rise of the process gas is directly proportional to the sulfur dioxide converted in each pass.

Commercial vanadium pentoxide catalysts do not show sustained catalytic activity at temperatures below 390° C., although it is well documented that new catalysts may have initial-reaction ignition temperatures as low as 375° C. The catalyst ignition temperature represents an operating condition below which substantial catalytic conversion of sulfur dioxide cannot be sustained in any given bed or pass.

Figure 3:
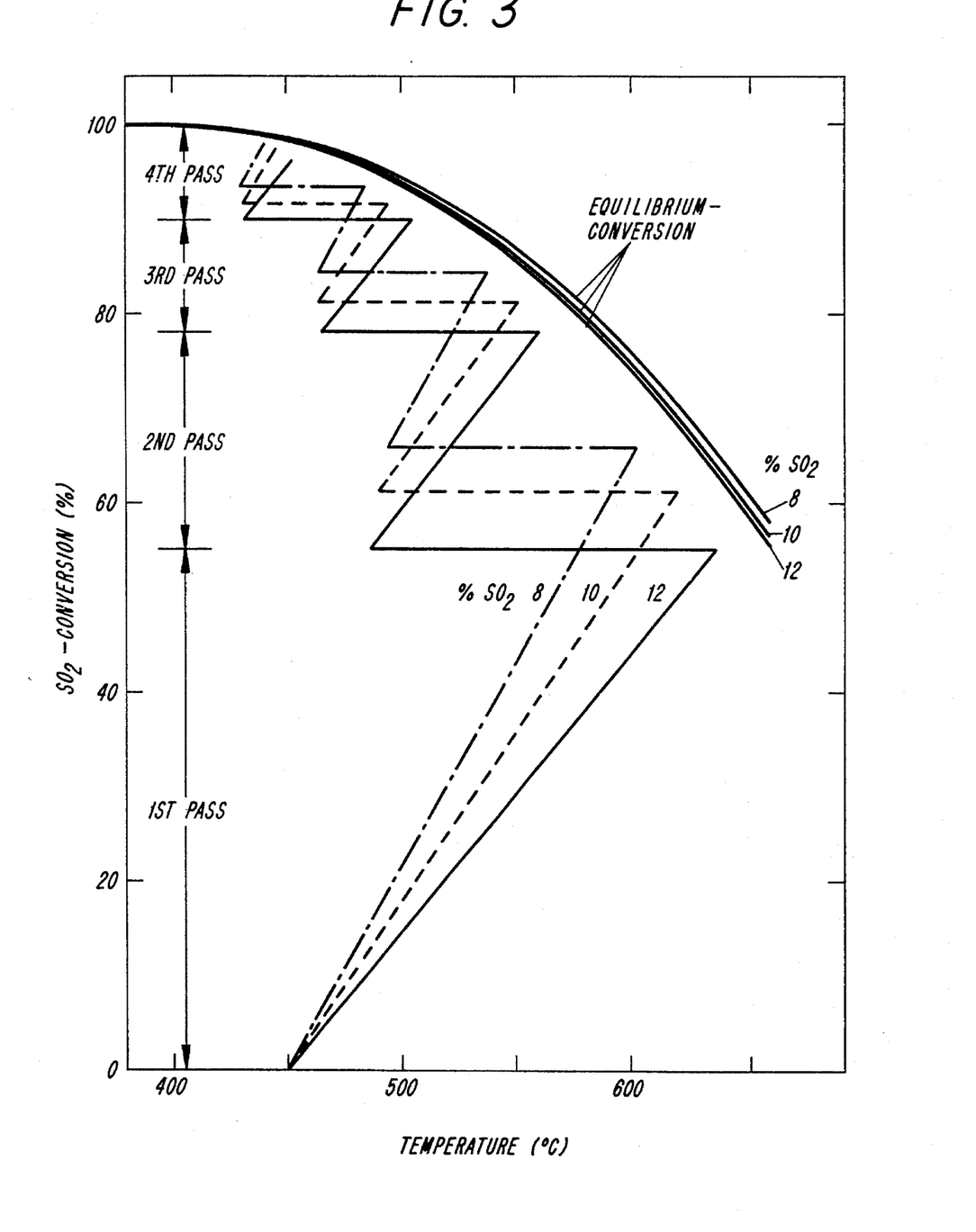
FIG. 3 is a graph illustrating the practical conversion efficiency achieved in a four-pass adiabatic catalytic converter with indirect interstage cooling.

FIG. 3 illustrates the practical conversion efficiency achieved in a typical adiabatic four-pass catalytic converter with interstage cooling for process-gas streams containing 8%, 10% and 12% sulfur dioxide. As shown in FIG. 3, the conversion of sulfur dioxide increases in the first pass from zero to above 50%. As conversion proceeds, the temperature increases from about 450° C. to above 550° C. in the first pass. As the temperature further increases, the maximum equilibrium conversion is approached. Between the first and second passes, the temperature is reduced. This allows for greater conversion efficiency in the second pass. Likewise, in the second, third and fourth passes, conversion proceeds until the maximum practical and economical equilibrium conversion is approached with cooling between passes.

Referring again to FIG. 1, process gas leaving the last converter pass is preferably cooled to 100°–230° C., more preferably 120°–210° C. prior to sulfur trioxide absorption, the heat being recovered in the boiler feed-water heater (economizer) 55. The process gas is not typically cooled to a lower temperature, so as to minimize corrosion problems associated with condensing sulfuric acid originating from traces of water in the gas stream.

The gas leaving the economizer, in a single absorption plant, comprises typically 4–15%, more typically 7–12%, and even more typically 8–9% by volume $SO_3$. Also, the gas typically contains 1000 to 5000 ppm, and more typically 1500 to 3000 ppm by volume $SO_2$. The remainder of the gas stream contains oxygen, nitrogen and various impurities. Gas leaving the economizer or gas cooler 55 flows to an absorption tower 60 where sulfur trioxide is absorbed to produce sulfuric acid by reaction with free water contained in recirculating concentrated sulfuric acid.

Concentrated sulfuric acid circulates in the recirculation loop outlet 80 and inlet 75 legs in the tower 60. The acid inlet temperature at 78 for 98.5% sulfuric acid absorption towers is preferably 50°–100° C., and more preferably 70°–80° C. The sulfuric acid exits the absorption tower at 79 at preferably 75°–150° C., and even more preferably 100°–125° C., depending on acid circulation rate. Acid temperature rise within the absorption tower is attributable both to heat of hydration of sulfur trioxide and to absorbed sensible heat from the process gas. The hot product acid exiting the sulfur trioxide absorption tower is cooled in a heat exchanger (not shown) before being recirculated into the inlet leg 75 of the tower or pumped through line 73 into storage tanks 95. Make-up water 70 is added to react with the sulfur trioxide introduced into the tower 60. Sulfur dioxide, if present, is emitted from the tower through the stack 90 to the atmosphere.

In the United States, sulfur burning plants are required to limit sulfur dioxide stack emissions from the absorption tower. As discussed above, sulfur dioxide stack emissions have been previously reduced utilizing post process scrubbing techniques. In contrast to such post process scrubbing techniques, the present invention employs the use of oxidizing agents in the absorption tower allowing for an in-situ reaction which reduces sulfur dioxide emissions. By in-situ reaction, it is meant the reaction within a principal sulfur trioxide absorption zone within the sulfuric acid production plant.

As shown in FIG. 1, oxidizing agent introduction to the absorption tower 60 may occur in the recirculated stream of sulfuric acid at any point after removal of the product stream 73. Alternatively, the oxidizing agent may either be added directly to the absorption tower, to the outlet line of the absorption tower, to the make-up water to the absorption tower, or to any portion of the recirculation loop 65, 70, 75 and 80 either prior to or after removal of product sulfuric acid 73. To facilitate addition to tower 60 at the proper rate, the oxidizing agent may be premixed with some of the sulfuric acid, and a correspondingly larger volume of liquid is then introduced to tower 60.

New sulfur-burning acid plants are required to limit sulfur dioxide stack emissions to 2 kg of sulfur dioxide per metric ton of 100% acid produced (4 lb/short ton), which is equivalent to a sulfur dioxide conversion efficiency of 99.7%. This high conversion efficiency is not achievable with conventional single $SO_3$-absorption plants with current catalyst performance but can be attained in double $SO_3$-absorption plants when the catalyst is not seriously degraded. However, even with double-absorption plants, when the plant is pushed to exceed its maximum design capacity, sulfur dioxide emissions are increased above the allowable emission standards. The present invention may be utilized to increase sulfuric acid capacity without exceeding sulfur dioxide emission limits.

Typical double-absorption plant design includes a first or intermediate sulfur trioxide absorption stage after the second or, more commonly, the third converter pass, whereupon all of the treated gas from this absorption stage is treated in a subsequent, or fourth, catalytic conversion step, followed by another $SO_3$ absorption step to remove additional sulfur trioxide produced. Modern double-absorption plants usually contain a total of four catalyst passes.

Figure 2:
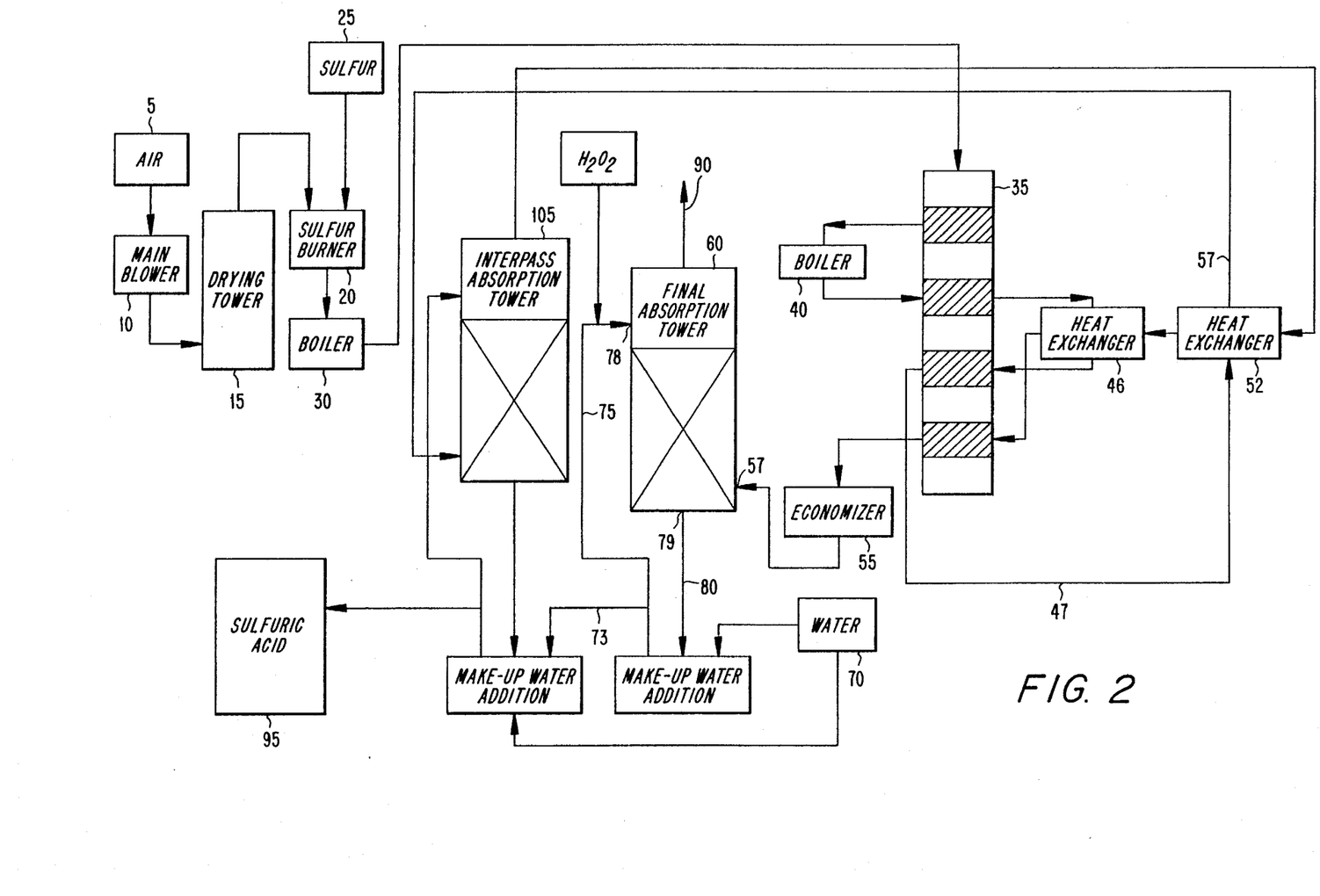
FIG. 2 illustrates a process for producing sulfuric acid containing an interpass absorption tower and a final absorption tower.

FIG. 2 presents a typical flow diagram for a modern sulfur-burning, double $SO_3$-absorption plant. Approximately 80–98%, and more preferably 90–96%, of the sulfur trioxide produced by the double-absorption process is absorbed in the interpass absorption tower 105; the balance of sulfur trioxide produced in subsequent converter passes is absorbed in the final absorption tower 60. Sulfuric acid circulation rates are adjusted so that acid temperatures exiting the absorption tower of single-absorption plants and the interpass absorption tower of double-absorption plants are preferably 80°–140° C., and more preferably 100°–125° C. The relatively smaller amount of sulfur trioxide absorbed in the final absorption tower of double-absorption plants typically raises its circulation-acid temperature only to preferably 105° C. or less. Interpass tower 105 and final absorption tower 60 of double-absorption plants are very similar in size since tower diameter is dependent on total gas throughput, not sulfur trioxide concentration.

Another difference between single- and double-absorption processes is that the process gas stream introduced into the final absorption tower in double-absorption processes typically contains 0.2 to 1.5%, more typically 0.6 to 1.2%, and most typically about 1% by volume $SO_3$. Also, the gas typically contains 200 ppm to 800 ppm, more typically 300 ppm to 500 ppm by volume $SO_2$. The remainder of the gas stream contains oxygen, nitrogen and various impurities.

Another difference between single- and double-absorption processes is that, after interpass absorption, the process gas is desirably reheated from about 60° C. to about 460° C., more preferably about 80° C. to about 425° C. before reentering the converter. Reheating the process gas is accomplished in gas-to-gas heat exchangers 46 and 52. These exchangers simultaneously cool hot gas streams leaving the converter passes 2 and 3. Most other plant operations are very similar to the corresponding single-absorption process.

In all of the above processes, the addition of the oxidizing agent to the final sulfur trioxide absorption tower will enable the plant to be operated above its maximum rated capacity by burning more sulfur and producing more sulfur trioxide as well as sulfur dioxide, while converting the incremental amount of sulfur dioxide to additional sulfuric acid, and while keeping sulfur dioxide emissions within legal limits. An important process characteristic is that, depending upon current demand for additional sulfuric acid product above the maximum rated capacity, the production rate of the plant can readily be varied by simply increasing or decreasing the sulfur burning rate and adjusting peroxide compound addition to assure removal of excess $SO_2$ present in the stack emissions.

In conventional processes, a maximum production capacity of sulfuric acid is achieved in a given plant for given operating conditions consistent with plant design. The maximum capacity is normally limited by the converter which is typically operated at its minimum current legal conversion efficiency of 99.7% in double-absorption plants. If, however, the sulfur burning rate is increased above the maximum design burning rate (dictated by the amount of sulfur dioxide that is permitted to be emitted from the stack), an additional amount of sulfur dioxide is introduced into the catalytic converter and a decrease in converter conversion efficiency below the minimum legal results. Consequently, while the sulfur trioxide production in the converter is increased, and thus the sulfuric acid production is also increased, the amount of unconverted sulfur dioxide is simultaneously increased. This additional incremental unconverted sulfur dioxide is emitted from the stack and would exceed emissions limits in the absence of a suitable method to contain it.

Accordingly, by use of preferred embodiments of the invention, the sulfuric acid production rate of a manufacturing plant may be increased by at least 1%, preferably 3–20%, and more preferably 20–50% and higher above its rated capacity and the additional incremental $SO_2$ generated (which is not converted to $SO_3$ in the catalytic oxidation zone) is counteracted by the addition of the peroxide into the absorption zone. The peroxide may be used in these instances to effectively reduce $SO_2$ plant emission to less than 4 lb $SO_2$ per short ton of $H_2SO_4$ produced.

A typical plant response to such an increase in sulfur burning rate may be illustrated as follows. A given plant, which is designed to produce a maximum of 1,994 short tons per day operates, at a sulfur burning rate of 2,000 short tons $H_2SO_4$ per day, a burner gas strength (amount of sulfur dioxide in the gas exiting the sulfur burner) of 11.5% and a conversion efficiency of 99.7%, which is the minimum legally allowed. However, if, for example, a 3% increase in acid production capacity is desired (i.e., the plant is pushed to burn sulfur to an equivalent sulfuric acid rate of about 2,060 short tons/day), a burner gas strength of 11.845% sulfur dioxide equivalent and a conversion efficiency of 99.65% would be observed. As a result, the sulfur dioxide emissions would be raised from 3.9 lb/ton $H_2SO_4$ to 4.7 lb/ton $H_2SO_4$, i.e., to an amount higher than current E.P.A. legal limits. In other words, for an increase in production capacity of about 60 tons/day sulfuric acid, the concomitant incremental sulfur dioxide emissions or stack losses would be about 0.8 tons/day of sulfur dioxide. This is the amount to be oxidized by peroxide to yield 1.2 tons/day of sulfuric acid produced by peroxide oxidation.

According to the invention, the oxidation of the incremental sulfur dioxide takes place in liquid phase in an $SO_3$ absorption tower with the aid of hydrogen peroxide or other peroxide compound earlier described herein. Sulfur dioxide is sufficiently dissolved in a medium of concentrated sulfuric acid and then readily reacts with hydrogen peroxide or similar peroxide compound that has been added to the acid. To achieve the desired purpose, hydrogen peroxide or the equivalent amount of Caro's acid or the like may be introduced into the absorption stage in a ratio equivalent to at least about 0.53 part $H_2O_2$ per 1 part of $SO_2$ to be removed. Thus, for instance, between about 0.53 and 2 or preferably between 0.53 and 0.75, part $H_2O_2$ per part of $SO_2$ to be removed may be added.

The weight ratio of added peroxide to concentrated acid flowing through the absorption zone may be in the range of 1:1,000 to 1:200,000, preferably 1:10,000 to 1:100,000. The concentration of free hydrogen peroxide in the recirculating sulfuric acid flow will vary from point to point in the absorption zone. At the point of entry into the absorption zone, the concentration by weight of free hydrogen peroxide may be in the range of 0–150 ppm, preferably 1–100 ppm and more preferably 1–25 ppm. The concentration of free hydrogen peroxide at the end of the absorption zone will preferably be zero since all peroxide desirably reacts.

The acid withdrawn from the absorption zone may contain 20 to 200 ppm sulfur dioxide. This sulfur dioxide will react with the peroxide very readily and thus both will preferably disappear and become non-detectable, and undistinguishable from the sulfuric acid media. Thus, in some situations in which the desired gaseous sulfur dioxide reduction from the stack is minor, say, 50 ppm, when peroxide is injected into the absorption zone, it may be impossible to detect any peroxide, i.e., the resulting concentration will be zero. When larger $SO_2$ reductions are needed, peroxide may be detected.

The process of the present invention includes the absorption of sulfur dioxide in concentrated sulfuric acid solutions where it forms sulfurous acid with the free water present according to the following reaction:

$$SO_2 + H_2O \rightarrow H_2SO_3 \qquad (I)$$

Oxidizing agents of the present invention such as hydrogen peroxide readily oxidize the sulfurous acid to sulfuric acid by the following reaction:

$$H_2O_2 + H_2SO_3 \rightarrow H_2SO_4 + H_2O \qquad (II)$$

Hydrogen peroxide may be injected directly into the final absorption tower for this purpose. Alternatively, Caro's acid (peroxymonosulfuric acid, $H_2SO_5$) may be prepared separately from hydrogen peroxide and sulfuric acid and then injected into the tower as the oxidizing agent, to accomplish the same result according to the following reactions:

$$H_2O_2 + H_2SO_4 \rightarrow H_2SO_5 + H_2O \qquad (III)$$

$$H_2SO_5 + H_2SO_3 \rightarrow 2H_2SO_4 \qquad (IV)$$

In the above example of a plant designed to produce about 2000 tons $H_2SO_4$ per day, the 0.8 tons per day of incremental sulfur dioxide emissions would consume 0.425 tons of hydrogen peroxide, corresponding to a weight ratio of 0.53125 part $H_2O_2$ per part of $SO_2$. Such reaction would bring the plant emissions essentially back down to the original level. In doing so, the 0,425 tons or 850 lb of hydrogen peroxide consumed, worth about $800–$900, would allow the incremental production of about 60 tons of sulfuric acid, worth about $3,000, in a plant otherwise producing 2,000 tons of $H_2SO_4$ per day, showing a high leverage for the use of the peroxide compound. Any extraneous residue left behind by the peroxide compound if a compound such as ammonium persulfate or peroxymonophosphoric acid is used, should amount to under 0.1% by weight of sulfuric acid product and would be of negligible significance for most end uses.

Because the introduction of the oxidizing agent does not change the volumetric gas flow and because no additional process equipment is required, the plant gas side pressure drop or the blower loading are not changed. Therefore, a unique facet of a preferred embodiment of the invention is that the oxidation of the incremental sulfur dioxide generated will keep emissions below the prescribed limits without requiring additional absorption towers or other equipment which would represent an additional pressure drop to the system as well as an extra capital expense. Moreover, since the selected oxidizing agent form no extraneous by-product and no significant contaminants, no by-product is required to be removed from the product acid for separate marketing or disposal.

Another unique feature of the invention is the discovery that the reaction or reactions that take place in the final absorption tower take place in concentrated sulfuric acid (above 90%, preferably above 95% and more preferably between 96–99.9% sulfuric acid concentrations) and at the relatively high temperature present in the absorption towers (between 50° and 150° C.). Of course, lower concentrations of sulfuric acid may be utilized, for example, concentrations as low as 70% $H_2SO_4$.

It has also been a surprise that the rate of $SO_2$ absorption by the sulfuric acid absorption medium and the concomitant oxidation of the $SO_2$ by the added peroxide compound has been found to be sufficiently high and sufficiently efficient under the high temperature and acid concentration conditions normally prevailing in $SO_3$ absorption towers of conventional sulfuric acid plants, to allow the invention to be used in existing or standard $SO_3$ absorption equipment of an otherwise conventional sulfuric acid manufacturing plant, without requiring the installation of any additional external scrubber.

Furthermore, increased sulfur burning which is made possible by the present invention also increases the amount of energy which can be extracted from a sulfuric acid plant. Since the blower/turbine which normally drives the sulfuric acid plant gas side is not necessarily affected by the modifications to the process according to the invention, the incremental heat energy generated by the additional sulfur combustion can be usefully extracted largely as a net energy gain.

In short, additional advantages of the invention over other systems include not only increased profits through increased sulfuric acid production capacity and energy production, but simultaneously also the avoidance of any significant need for additional gas scrubbers or other equipment or extensive re-engineering, the avoidance of by-products generated, such as ammonium sulfate, which may or may not be desirable to the plant. Another advantage is that it allows for an extended production campaign under deteriorated catalyst conditions which would otherwise require a shutdown for catalyst cleaning or replacement. At the same time, unlike in the case where tail-gas is separately scrubbed for $SO_2$ removal, the system of the invention allows changing production capacity on demand, virtually by the push of a button.

The engineered system of peroxide compound injection may be totally automated, integrated with the sulfur dioxide emission measurements and with the burner temperature measurements, and should not require operational assistance beyond the normal, existing plant operating staff. Also, the technology can be engineered so that no safety concerns or other deleterious effects exist.

The following three sets of examples are offered to illustrate various runs conducted to verify certain aspects of the invention. Sulfur dioxide or sulfurous acid were reacted with hydrogen peroxide or Caro's acid in strong sulfuric acid media under three sets of progressively more complex conditions. The first set was done in an open beaker at room temperature. In order to obtain more accurate material balance data, the second set was done in a closed round bottom flask at 90° C. The final set also done in a closed round bottom flask at elevated temperature, including an air purge which was vented to a scrubber flask.

EXAMPLES 1–4

Reaction of Hydrogen Peroxide With Sulfurous Acid in Sulfuric Acid at Room Temperature The first set of runs were carried out in an open beaker which was stirred with a magnetic stirring bar using a magnetic stirring plate.

These runs were completed with a sulfurous acid solution which was made by adding 20 cc of 6% $H_2SO_3$ to 500 grams of reagent grade $H_2SO_4$. The resulting solution is about one-half the saturation concentration of sulfurous acid in sulfuric acid at 90° C. The saturation concentration of sulfur dioxide in concentrated sulfuric acid at 90° C. is about 0.5 g sulfur dioxide/100 g $H_2SO_4$ or 0.65 g $H_2SO_3$/100 g $H_2SO_4$.

Four sampling flasks were prepared by pipetting 25 ml of standard iodine solution into each of the flasks. 100 ml of water was added to each along with a stirring bar. Each of the flasks was then weighed and the weight recorded. The water was added to control the amount of heat generation caused when concentrated acid was added to the flasks during the sampling procedure. The flasks were then labeled blank, 10, 20 and 30 seconds.

An iodine solution reacted with the remaining sulfurous acid in the sample by the following reaction:

$$I_3^- + H_2SO_3 + H_2O \rightarrow H_2SO_4 + 3I^- + 2H^+$$

The excess iodine in the solution was titrated with standard thiosulfate by the following reaction and the sulfurous acid concentration back calculated:

$$I_3^- + 2S_2O_3^{=} \rightarrow 3I^- + S_4O_6^{=}$$

This is a standard analytical method for dissolved sulfurous acid.

The sulfurous acid solution in sulfuric acid was then weighed into the beaker on a top loader balance and the stirring bar was added. The beaker was placed on the stirring plate and the stirrer started. The sample blank was taken at that time by withdrawing 10 ml of the acid solution with a glass syringe equipped with a Teflon plunger and delivered into the flask labeled blank.

Hydrogen peroxide (30% wt/wt) was added by volume to the solution in the beaker using a one cc plastic syringe. The remaining three samples were then withdrawn in quick succession from the beaker using a 10 cc glass syringe and delivered into the remaining tared Erlenmeyer flasks labeled 10, 20, and 30 seconds.

The four Erlenmeyer flasks were re-weighed to obtain the weight of each sample added to the flasks. One ml of starch indicator was added to each flask and the flasks were titrated with the standard thiosulfate solution from a brown solution to a clear end point.

The blank solution was defined as zero time. The results of these runs are shown in Table 1.

TABLE 1

| AMBIENT TEMPERATURE EXPERIMENTS IN OPEN BEAKER | | | | |
|---|---|---|---|---|
| EXAMPLE | 1 | 2 | 3 | 4 |
| M MOLES $H_2SO_3$ ADDED | 1.86 | 1.76 | 1.86 | 1.93 |
| M MOLES OF $H_2O_2$ ADDED | 0 | 0.21 | 0.61 | 2.13 |
| % OXIDATION IN 10 SECONDS | 2.3 | 22 | 38 | 99 |
| % OXIDATION EXPECTED | 0 | 12 | 33 | 100 |

Figure 4:
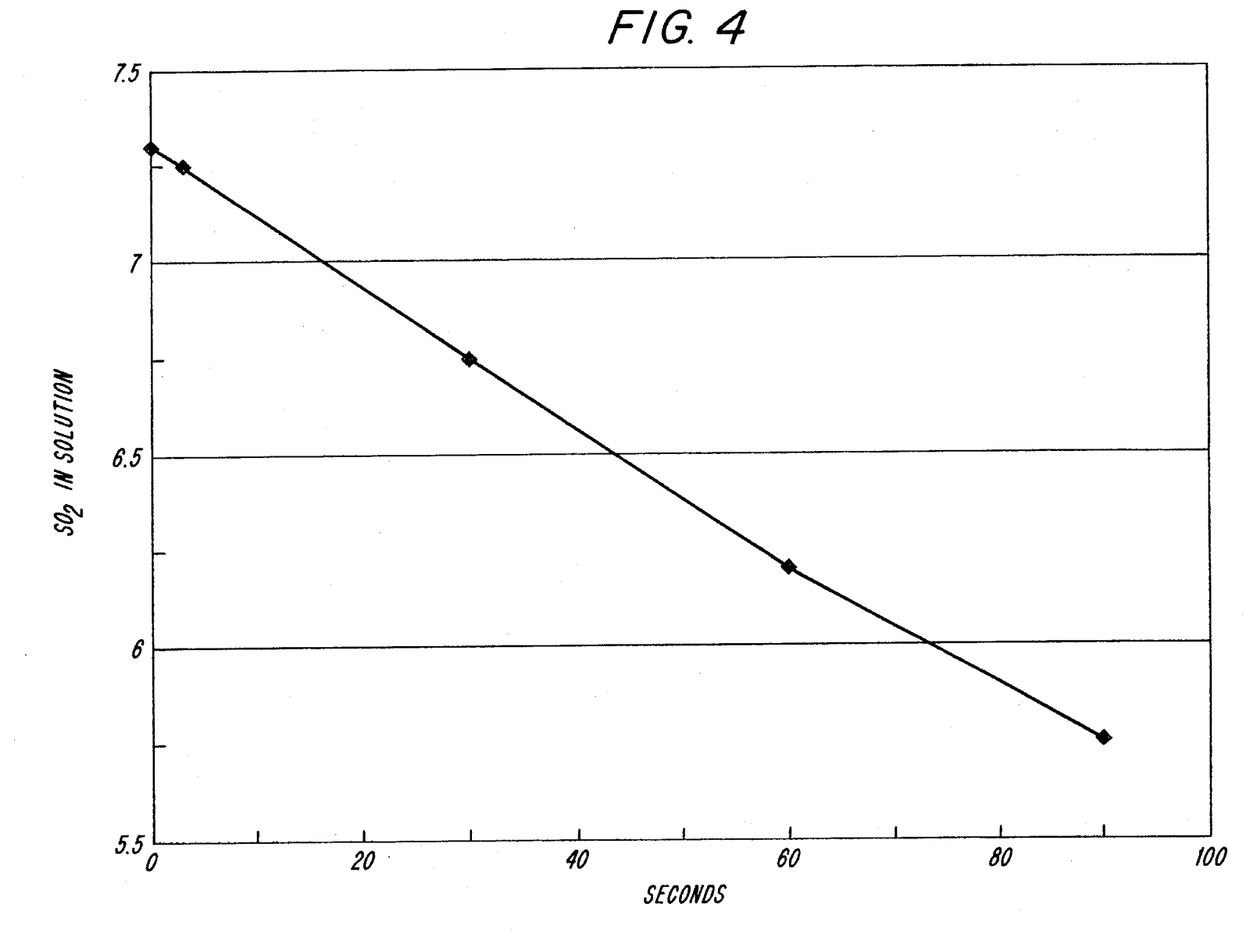
FIG. 4 is a graph illustrating the rate of evaporation of sulfur dioxide from a sulfuric acid solution.

Table 1 is arranged in the order of increasing concentration of hydrogen peroxide added to the reaction solution. In Example 1, hydrogen peroxide was not added to the acid solution, so that the rate of loss of sulfur dioxide by evaporation from the open beaker could be determined. An evaporation rate of 2.32% per ten second interval was observed. For a 30 second experiment, a 7% loss of sulfur dioxide should be expected through simple evaporation from the open beaker. See FIG. 4.

Figure 5:
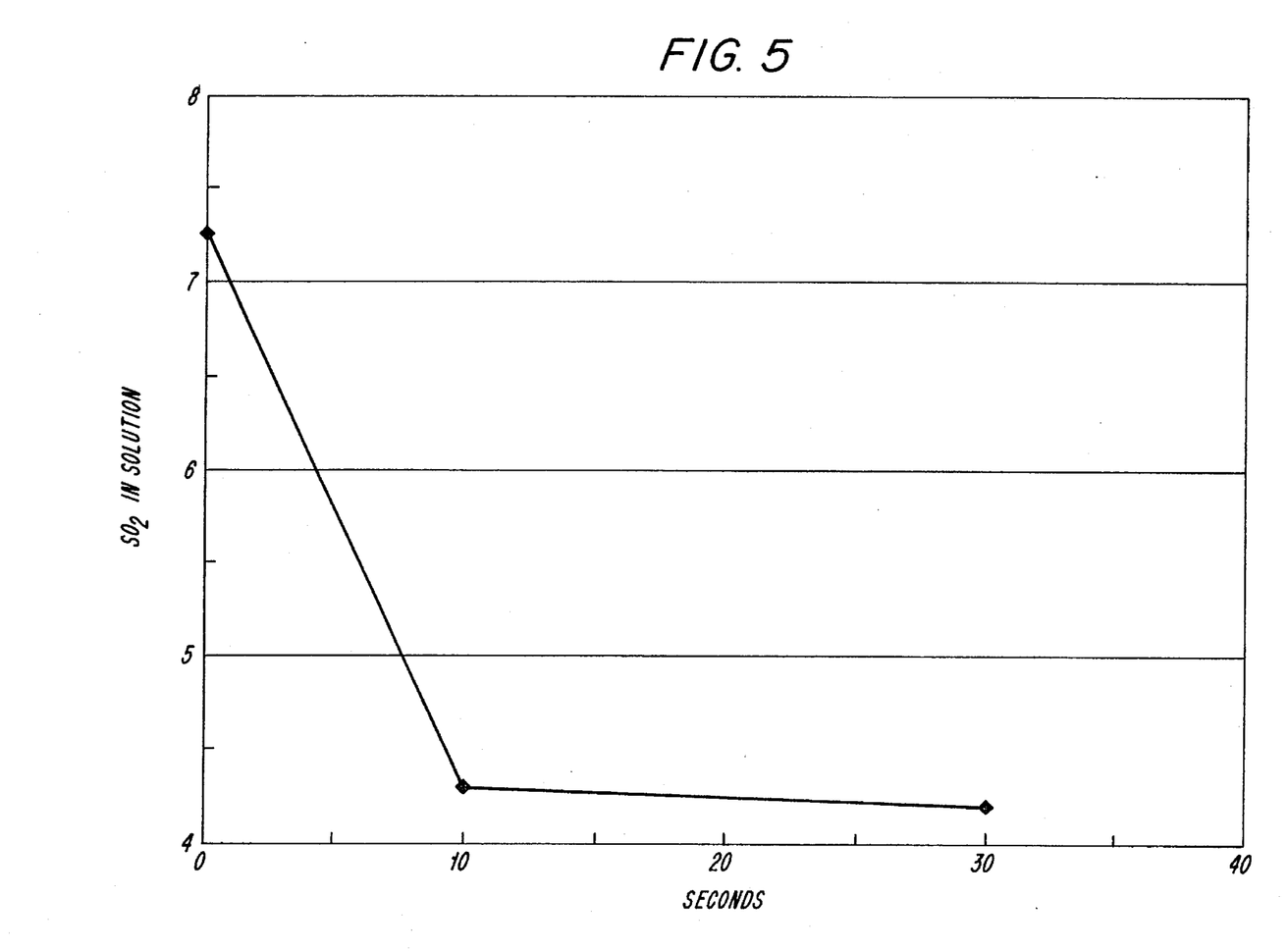
FIG. 5 is a graph illustrating the removal of sulfur dioxide from a sulfuric acid solution with a peroxide compound and the evaporation of sulfur dioxide from the sulfuric acid solution.

In this series of tests, the reduction in concentration of the sulfurous acid during the first ten- second interval is the reaction of the hydrogen peroxide with the sulfurous acid. The continued reduction during the remaining time of the test is the loss of sulfur dioxide from solution due to evaporation. See FIG. 5. In Example 2 shown in Table 1, the amount of hydrogen peroxide added should have produced a 12 percent reduction in the sulfurous acid content. A 22% drop was observed in the experiment during the first 10 second interval. The larger than expected reduction is consistent with the expected evaporation loss and within the experimental error of this type of test. The amount of hydrogen peroxide added in Example 3 should have produced a 33% reduction of the sulfurous acid. The amount of reduction observed was 38% which is well within the expected evaporation loss and the experimental error associated with this type of work. The amount of hydrogen peroxide added in Example 4 should have produced a 100% reduction of the sulfurous acid. The amount of reduction observed was 99%. This is again within the expected experimental error for this type of work.

This set of tests shows that even at room temperature the reaction takes place in ten seconds or less in substantially stoichiometric quantities.

EXAMPLES 5-6

Reaction of Hydrogen Peroxide with Sulfurous Acid in Sulfuric Acid at Elevated Temperatures in a Closed System This set of runs was carried out in a closed system at elevated temperatures using a three-neck, round-bottom flask having each of its necks sealed with an adapter. The flasks were stirred with a football-shaped magnetic stirring bar using a magnetic stirring plate. Samples were withdrawn with a syringe through a three-way syringe valve mounted through the top of the center neck of the flask.

The first run of this set was completed using a sulfurous acid solution which was made by adding 20 cc of 6% $H_2SO_3$ to 500 grams of reagent grade $H_2SO_4$. This solution was added to the flask from a tared beaker. The beaker was then re-weighed to obtain the weight of acid solution added to the flask. A football shaped stirring bar was added to the flask and the flask was sealed. The heating mantle and stirrer were then turned on to heat the acid solution.

When the acid solution reached 90° C., a sample blank was taken by withdrawing 10 ml of the acid solution with a glass syringe having a Teflon plunger through the three-way syringe valve mounted on the top of the round bottom flask and delivered into the first sample flask labeled blank. It was observed that even in a closed system losses by evaporation are very high at elevated temperatures.

The hydrogen peroxide solution (30% wt/wt) was added by volume to the solution in the flask using a one cc plastic syringe equipped with a 12 inch needle. The hydrogen peroxide was delivered below the surface of the acid solution to minimize possible loss of the peroxide. The remaining two samples were then withdrawn in quick succession from the flask using a 10 cc glass syringe and delivered into tared Erlenmeyer flasks.

The results of this run listed as Example 5 are shown in Table 2 below.

The second run of this set was modified to compensate for the large loss of sulfur dioxide seen in the previous run. This run was carried out in the same equipment as the first.

Example 6 of this set started with sulfuric acid which was added to the flask from a tared beaker. The beaker was then re-weighed to obtain the weight of acid solution added to the flask. The football shaped stirring bar was added to the flask and the flask was sealed. The heating mantle and stirrer were then turned on to heat the acid.

When the acid reached about 85° C., the sulfurous acid was added by weight with a tared 5 cc plastic syringe equipped with a 12 inch needle. The syringe was re-weighed to obtain the weight of the sulfurous acid added to the sulfuric acid. The sulfurous acid was delivered below the surface of the solution to minimize the loss of sulfur dioxide. The temperature rise caused by the addition of the sulfurous acid resulted in a final temperature of about 105° C.

The hydrogen peroxide was added by weight to the solution in the flask using a tared one cc plastic syringe equipped with a 12 inch needle. The syringe was re-weighed to obtain the weight of hydrogen peroxide added to the acid solution. The hydrogen peroxide was delivered below the surface of the acid solution to minimize possible loss of the peroxide. Two samples were then taken in quick succession by withdrawing 10 ml of the acid solution by the glass syringe with the Teflon plunger through the three way syringe valve mounted on the top of the round bottom flask and delivered into the tared sample flasks labeled 1, and 2 and analyzed.

The results of this run are shown in Table 2 as Example 6.

TABLE 2

REACTION OF HYDROGEN PEROXIDE WITH
SULFUROUS ACID IN SULFURIC ACID AT
90° C. IN A CLOSED FLASK

| EXAMPLE | 5 | 6 |
|---|---|---|
| M MOLES $H_2SO_3$ ADDED | 2.96** | 4.14 |
| M MOLES OF $H_2O_2$ ADDED | 2.09 | 1.83 |
| % OXIDATION IN 10 SECONDS | 100 | 62 |
| % OXIDATION EXPECTED | 67 | 44 |

**M MOLES LOST TO EVAPORATION 2.2

There were only two examples completed before the apparatus and procedure were modified to obtain more complete information on the reaction.

In Example 5, the sulfurous acid solution was added to the round bottom flask and heated to 90° C. before the hydrogen peroxide was added and the reaction solution was sampled. Due to the length of time that it took to heat the acid solution, very little of the sulfur dioxide remained in the solution. Due to the small amount of sulfur dioxide remaining, the amount of hydrogen peroxide added was in excess of that needed for complete reaction.

In Example 6, sulfuric acid was added to the round bottom flask and heated to 90° C. When the solution had reached the desired temperature, the sulfurous acid was added to the hot sulfuric acid. The addition of the sulfurous acid increased the temperature from 85° C. to 105° C. The hydrogen peroxide was then added to react with the sulfurous acid. As shown in Table 2, the amount of reaction of the sulfurous acid was greater than that expected indicating that a loss of sulfur dioxide could have occurred during the addition of the sulfurous acid. This would have been facilitated by the high temperature of the sulfuric acid and the extra heat generated during the addition.

The last two examples indicate that the amount of sulfur dioxide lost from solution by evaporation at high temperature was too high for obtaining good data in this kind of setup. The apparatus was then modified to capture the sulfur dioxide lost from solution.

EXAMPLES 7–10

Reaction of Hydrogen Peroxide with Sulfurous
Acid in Sulfuric Acid at Elevated Temperatures
with Recapture of $SO_2$ Accordingly, this set of runs was also carried using a three-neck round-bottom flask at elevated temperatures, similar to the previous set, each of the necks again being sealed with an adapter to provide a closed system. As before, the flask was stirred with a football-shaped magnetic stirring bar using a magnetic stirring plate, but in this set of tests the system was equipped with a thermometer adapter equipped with a side arm to deliver an air purge into the system and with another side arm to vent the air purge for analysis. More particularly, the air purge stream was scrubbed and collected in a flask filled with water and the water was analyzed. Samples were withdrawn with a syringe through a three-way syringe valve mounted through the top of the center neck of the flask.

These runs started with sulfuric acid which was added to the flask from a tared beaker. The beaker was re-weighed to obtain the weight of acid solution added to the flask. The football shaped stirring bar was added to the flask and the flask was sealed. The heating mantle and stirrer were then turned on to heat the acid.

An air purge flask was prepared by placing 100 ml of water into a 250 ml Erlenmeyer flask. This flask was used to collect the sulfur dioxide which escaped the solution in the round bottom flask.

When the acid reached about 80° C., hydrogen peroxide was added to the solution in the flask using a tared one cc plastic syringe equipped with a 12 inch needle. The syringe was re-weighed to obtain the weight of hydrogen peroxide added to the acid solution. The hydrogen peroxide was delivered below the surface of the acid solution to minimize possible loss of the peroxide.

The air purge vent tubing was then placed into the air purge flask below the level of the water in the flask.

The sulfurous acid was added by weight with a tared 5 cc plastic syringe equipped with a 12-inch needle. The syringe was re-weighed to obtain the weight of the sulfurous acid added to the sulfuric acid. The sulfurous acid was delivered below the surface of the solution to minimize the loss of sulfur dioxide. The temperature rise caused by the addition of the sulfurous acid resulted in a final temperature of about 100° C. Two samples were then taken in quick succession by withdrawing 10 ml of the acid solution by the glass syringe with the Teflon plunger through the three-way syringe valve mounted on the top of the round bottom flask and delivered into the tared flasks.

After sample collection was complete and all of the weights recorded, the air purge vent tubing was removed from the air purge flask. Ten milliliters of standard iodine solution was pipetted into the flask and one ml of starch indicator was added. The flask was titrated with the standard thiosulfate solution from a brown solution to a clear end point.

The results of these runs are shown in Table 3 below.

TABLE 3

REACTION OF HYDROGEN PEROXIDE
WITH SULFUROUS ACID AT 90° C. IN A
CLOSED SYSTEM WITH AN AIR PURGE

| EXAMPLE | 7 | 8 | 9 | 10 |
|---|---|---|---|---|
| M MOLES $H_2SO_3$ ADDED | 4.11 | 4.18 | 4.14 | 4.16 |
| M MOLES OF $H_2O_2$ ADDED | 3.77 | 5.9 | 4.82 | 4.94 |
| % OXIDATION IN 10 SECONDS | 74 | 106 | 90 | 101 |
| % OXIDATION EXPECTED | 92 | 100 | 100 | 100 |
| % SO2 VAPOR RECOVERED | 10 | 3.54 | 3.68 | 6.05 |

Since the hydrogen peroxide was added before $H_2SO_3$, it was not possible to obtain an initial (time zero) sample. The initial sample values in this set of were calculated based on the quantities of the reactants added.

As seen from Table 3, a mole ratio of about 1.2 hydrogen peroxide ($H_2O_2$) to sulfurous acid ($H_2SO_3$) is required for complete reaction. Some bubbling is seen when the hydrogen peroxide was added to the hot solution indicating some possible hydrogen peroxide decomposition. This may explain why some excess hydrogen peroxide seems to be required to get complete reaction under these test conditions.

Some loss of sulfur dioxide was also seen from the solution. This was evidenced by some bubbling of the solution when the sulfurous acid was added. The greater the rate of addition, the greater the bubbling rate. The sulfurous acid was added at a higher rate of addition in Example 7 shown in Table 3 than the rest of the runs and gave the highest rate of loss of sulfur dioxide from solution. Even in Example 7, the loss was less than eleven percent of the sulfurous acid added to the reaction solution.

Figure 6:
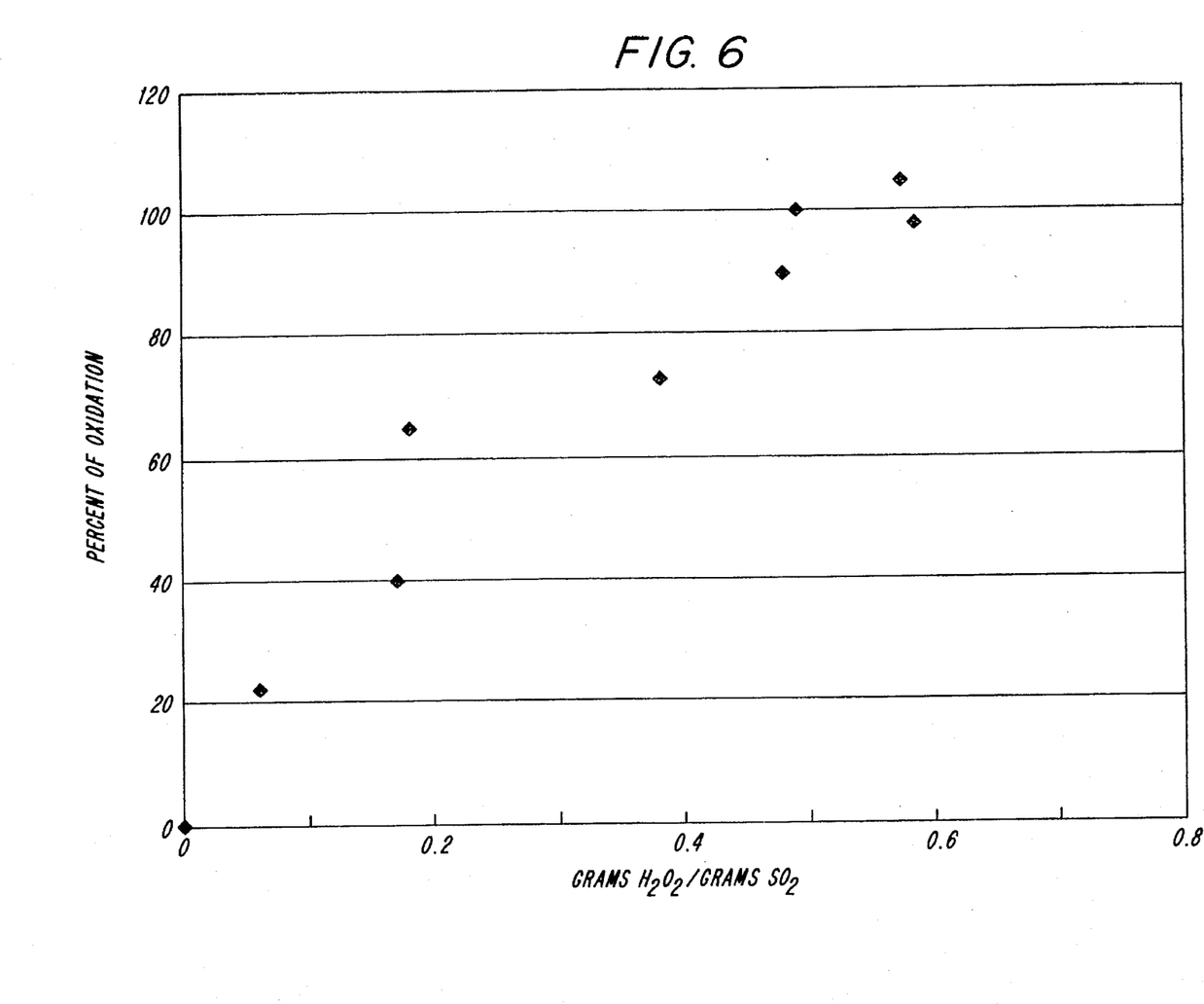
FIG. 6 is a graph illustrating the oxidation of sulfur dioxide in a sulfuric acid solution with a peroxide compound.

The results of all of the runs are shown in FIG. 6. The percent of reduction of sulfur dioxide is plotted versus the ratio of hydrogen peroxide to sulfur dioxide in parts by weight. As seen in FIG. 6, it would take a ratio of about 0.6 to get complete destruction of the sulfurous acid in sulfuric acid under these conditions, which is close to the stoichiometric ratio within experimental error.

Although the laboratory tests are carried out in a very small scale, when compared to the scale of commercial sulfuric acid manufacturing plants and although the tests were, per force, carried out in a batch mode and in the absence of free sulfur trioxide, as compared with commercial sulfuric acid plants which operate on a very much larger scale, in a continuous mode and which have free sulfur trioxide present in the $SO_3$ absorption towers, the laboratory tests nevertheless convincingly demonstrate the validity of the essential reactions and operating procedures on which the present invention is based.

In sum, one of ordinary skill in the art can easily ascertain the essential characteristics of the instant invention, from the foregoing description and can make various changes and/or modifications of the invention to adapt it to various usages and conditions without departing from the spirit and scope thereof. As such, these changes and/or modifications are properly, equitably and intended to be within the full range of equivalents of the following claims.

What is claimed is:

1. A process for removing $SO_2$ from a gas mixture comprising $SO_3$ in an amount greater than zero and less than or equal to 15% by volume, $SO_2$ in an amount greater than zero and less than or equal to 5,000 ppm by volume and a volume ratio of $SO_3$ to $SO_2$ greater than 1 which process comprises introducing said gas mixture into a contacting zone at a temperature between about 50° and about 150° C. comprising aqueous sulfuric acid containing more than 90% by weight $H_2SO_4$ and 1 to 25 parts of a peroxide compound per million parts of said aqueous sulfuric acid; converting $SO_2$ to $H_2SO_4$ in said contacting zone; converting $SO_3$ to $H_2SO_4$ in said contacting zone; removing a stream of purified gas from an upper portion of the contacting zone; and removing a stream of sulfuric acid from a lower portion of the contacting zone.

2. The process according to claim 1, wherein said gas mixture comprises nitrogen and oxygen in addition to $SO_2$ and $SO_3$.

3. The process according to claim 1, wherein said gas mixture comprises about 4 to about 15% by volume $SO_3$ and about 1,000 to about 5,000 ppm by volume $SO_2$.

4. The process according to claim 1, wherein said gas mixture comprises about 0.2 to about 1.5% by volume $SO_3$ and about 200 to about 800 ppm by volume $SO_2$.

5. The process according to claim 1, wherein the peroxide compound is either $H_2O_2$ or peroxymonosulfuric acid and is added to the contacting zone in an amount corresponding to between about 0.53 and 2 parts by weight $H_2O_2$ per part by weight of $SO_2$ to be removed.

6. In a process for the commercial manufacture of sulfuric acid in a sulfuric acid manufacturing plant in which a sulfur dioxide containing gas and an oxygen-containing gas are reacted in a catalytic oxidation zone into a mixture comprising sulfur trioxide and sulfur dioxide having a volume ratio of $SO_3$ to $SO_2$ greater than 1, which process comprises introducing said mixture of sulfur trioxide and sulfur dioxide into an $SO_3$ absorber containing an aqueous sulfuric acid medium possessing an $H_2SO_4$ concentration greater than 90%; the improvement which comprises introducing 1 to 25 parts of a peroxide compound per million parts of said aqueous sulfuric acid medium into said $SO_3$ absorber; absorbing sulfur trioxide in said medium to produce $H_2SO_4$; dissolving and oxidizing the sulfur dioxide in said medium to produce additional sulfuric acid, reducing the $SO_2$ concentration in said mixture such that the sulfur dioxide content in the remaining gas phase is maintained at a concentration of less than 4 lb $SO_2$ per short ton of $H_2SO_4$ produced; and removing a stream of sulfuric acid and a stream of emission gas from said absorber.

7. The process according to claim 6, wherein the gas from said catalytic oxidation zone contains unconverted $SO_2$ in excess of 4 lb $SO_2$ per short ton of $H_2SO_4$ produced and said unconverted $SO_2$ is reduced by addition of the peroxide into the absorber in an amount which effectively reduces $SO_2$ plant emission to less than 4 lb $SO_2$ per short ton of $H_2SO_4$ produced without an increase in the pressure drop of the plant.

8. The process according to claim 6, wherein catalytic conversion efficiency is less than 99.7%.

9. The process according to claim 6, wherein said peroxide compound is hydrogen peroxide, peroxymonosulfuric, peroxydisulfuric acid, or peroxymonophosphoric acid.

10. The process according to claim 9, wherein said peroxygen compound is hydrogen peroxide.

11. The process according to claim 6, wherein said sulfuric acid in said $SO_3$ absorber is recirculated through a recirculating loop.

12. The process according to claim 11, wherein said peroxide compound is introduced into said recirculating loop at any point of the loop.

13. The process according to claim 6, wherein said peroxide compound is premixed with sulfuric acid before introduction in the $SO_3$ absorber.

14. The process according to claim 6, wherein the concentration of sulfuric acid in said $SO_3$ absorber is above 95% by weight.

15. The process according to claim 14, wherein the concentration of sulfuric acid produced in said $SO_3$ absorber is between 96 and 99.9% by weight.

16. The process according to claim 15, wherein the temperature in said $SO_3$ absorber is above 50° C. and up to 150° C.

17. The process according to claim 6, wherein said peroxide compound is introduced directly into said absorber.

18. In a process for the manufacture of sulfuric acid in a sulfuric acid manufacturing plant, which process comprises:

introducing a sulfur-containing feed material into a reaction zone maintained at conditions suitable for producing gaseous sulfur dioxide;

introducing at least a portion of the gaseous sulfur dioxide in the presence of an oxygen-containing gas into a catalytic conversion zone maintained at conditions suitable for converting the gaseous sulfur dioxide into a gas mixture containing sulfur trioxide and sulfur dioxide;

introducing the mixture of sulfur dioxide and sulfur trioxide into a lower portion of an $SO_3$ absorber containing a downwardly moving sulfuric acid absorption medium maintained at a temperature above 50° C. and up to about 150° C.; the improvement which comprises introducing 1 to 25 parts of a peroxide compound per million parts of said sulfuric acid absorption medium into said $SO_3$ absorber;

removing a stream of purified emission gas from an upper portion of the absorber, and removing a stream of sulfuric acid product from a lower portion of the absorber while keeping $SO_2$ emissions from the process no more than 4 lbs $SO_2$ per short ton of $H_2SO_4$ produced.

19. A process according to claim 18, wherein the peroxide compound is hydrogen peroxide, peroxymonosulfuric acid or peroxydisulfuric acid and is added into the absorber to provide therein the equivalent of between about 0.53 and 2 part by weight of $H_2O_2$ per part by weight of $SO_2$ to be removed therein.

20. A process according to claim 19, wherein the peroxide compound is introduced into the $SO_3$ absorber in an amount to maintain $SO_2$ emissions from the process at no more than 4 lb $SO_2$ per short ton of sulfuric acid produced when the catalytic conversion zone is not capable of providing 99.7% conversion efficiency.

21. A process according to claim 19, which comprises only one $SO_3$ absorber.

22. A process according to claim 21, wherein the gas mixture introduced into the $SO_3$ absorber comprises about 4 to 15% by volume of $SO_3$ and about 1,000 to 5,000 ppm by volume of $SO_2$, plus oxygen and nitrogen.

23. A process according to claim 19, which comprises two separate $SO_3$ absorbers and in which process:

the gas mixture containing sulfur dioxide and sulfur trioxide from a first catalytic conversion step is passed into a first $SO_3$ absorber containing sulfuric acid for the absorption of sulfur trioxide therein in the substantial absence of any peroxide compound;

a stream of sulfuric acid and a stream of sulfur dioxide-containing gas are removed from said first $SO_3$ absorber;

said sulfur dioxide-containing stream is passed through a second catalytic conversion step under conditions suitable for converting a major portion of the sulfur dioxide present into sulfur trioxide;

passing the resulting mixture of sulfur trioxide and residual sulfur dioxide into and upwardly through a second $SO_3$ absorber, said second $SO_3$ absorber containing a sulfuric acid absorption medium maintained at a temperature above 50° C. and up to about 150° C. and comprising sulfuric acid having an $H_2SO_4$ content greater than 90% by weight;

introducing 1–25 parts of a peroxide compound per million parts of said sulfuric acid absorption medium into said second $SO_3$ absorber so as to keep $SO_2$ emissions in the tail-gas from the plant no greater than 4 lbs per short ton of sulfuric acid produced; and removing a stream of purified tail gas from an upper portion and a stream of sulfuric acid product from a lower portion of said second $SO_3$ absorber.

24. A process according to claim 23, wherein the gas mixture introduced into the $SO_3$ absorber comprises about 0.2 to 1.5% by volume $SO_3$ and about 200 ppm to 800 ppm by volume $SO_2$, plus oxygen and nitrogen.

25. The process according to claim 23, wherein catalytic conversion efficiency is less than 99.7%.

* * * * *